United States Patent
Cabrini

(10) Patent No.: US 6,443,078 B2
(45) Date of Patent: Sep. 3, 2002

(54) PROCESS AND PLANT FOR DEPOLYMERIZING OF THE CH CHAINS OF SOLID MATERIALS

(75) Inventor: Clementino Cabrini, Verona (IT)

(73) Assignee: Tesi Ambiente S.r.l., Verona (IT)

( * ) Notice: Subject to any disclaimer, the term of this patent is extended or adjusted under 35 U.S.C. 154(b) by 0 days.

(21) Appl. No.: 09/784,306

(22) Filed: Feb. 16, 2001

(30) Foreign Application Priority Data

Feb. 18, 2000 (IT) .......................................... RE00A0008

(51) Int. Cl.⁷ .............................. F23B 7/00; F23J 11/00; F23K 1/00
(52) U.S. Cl. ...................... 110/342; 110/203; 110/218; 110/345; 110/346
(58) Field of Search ................................. 110/218, 219, 110/203, 215, 216, 342, 345, 346

(56) References Cited

U.S. PATENT DOCUMENTS

| | | | |
|---|---|---|---|
| 2,413,714 A | * 1/1947 | Keeling | 23/255 |
| 3,112,257 A | 11/1963 | Douwes et al. | |
| 4,284,616 A | 8/1981 | Solbakken et al. | |
| 4,468,011 A | 8/1984 | Sikander et al. | |
| 4,759,300 A | * 7/1988 | Hansen et al. | 110/229 |
| 4,839,021 A | 6/1989 | Roy | |
| 4,895,083 A | * 1/1990 | McDilda | 110/235 |
| 5,101,739 A | * 4/1992 | Nance et al. | 110/229 |
| 5,102,638 A | 4/1992 | Girrbach et al. | |
| 5,142,998 A | * 9/1992 | Feitel | 110/215 |
| 5,157,176 A | * 10/1992 | Munger | 585/7 |
| 5,185,134 A | * 2/1993 | Gullett | 423/240 R |
| 5,411,714 A | * 5/1995 | Wu et al. | 422/232 |
| 5,472,875 A | 12/1995 | Monticello | |
| 5,720,232 A | * 2/1998 | Meador | 110/346 |
| 5,746,987 A | 5/1998 | Aulbaugh et al. | |
| 5,782,188 A | * 7/1998 | Evans et al. | 110/346 |
| 5,807,410 A | * 9/1998 | Borsboom et al. | 23/293 S |
| 6,143,856 A | * 11/2000 | Roy et al. | 528/129 |
| 6,244,199 B1 | * 6/2001 | Chambe et al. | 110/346 |

FOREIGN PATENT DOCUMENTS

| | | |
|---|---|---|
| EP | 0672743 A1 | 3/1995 |
| GB | 1383122 | 2/1975 |

* cited by examiner

Primary Examiner—Ira S. Lazarus
Assistant Examiner—K. B. Rinehart
(74) Attorney, Agent, or Firm—Browdy and Neimark

(57) ABSTRACT

Materials containing CH polymer chains are treated by a process comprising triggering combustion of the material in an environment insulated from the outside; removing gaseous combustion products from the environment under a vacuum; feeding combustion-supporting gas in a quantity insufficient to create centers of combustion while maintaining the environment under vacuum to favor a process of molecular decomposition of the material; condensing the gases, and collecting the condensate in a non-pressurized environment.

5 Claims, 1 Drawing Sheet

PROCESS AND PLANT FOR DEPOLYMERIZING OF THE CH CHAINS OF SOLID MATERIALS

TECHNICAL FIELD

The present invention relates to the disposal of solid materials by incineration, and in particular the disposal of solid materials which generate highly pollutant gases when they burn.

BACKGROUND OF THE INVENTION

This type of material is very wide-ranging and comprises a large variety of synthetic products, plastic materials, and others.

This type of material is usually disposed of by incinerators, which involve a considerable energy cost and, notwithstanding gas purification, present drawbacks concerning the production of gaseous dioxins and other pollutant gases.

In addition to an understandable plant complication, the known processes involve oxidizing the treated material, so depleting its calorific value and rendering it very deficient as a fuel.

It is immediately evident that this considerably affects the economy of the process. The object of this patent is to dispose of materials consisting in particular of plastic materials of synthetic origin by the destruction or depolymerization of their CH chains, with simultaneous recovery of the resultant liquid condensate of the process, which has high energy power.

A last but not less important object of the invention is to implement cleaning of the off-gases such as to satisfy the current severe ecological regulations.

SUMMARY OF THE INVENTION

These objects of the invention are attained by the process and plant defined in the claims.

The process of the invention represents the combination of two mutually interacting steps, and takes place under vacuum at low temperature in the presence of an oxidizing agent such as oxygen or ozone.

The material to be treated is preferably comminuted into pieces of uniform dimensions, of the order of 50 mm to 300 mm, and then fed into a vessel acting as a reactor.

The quantity of material, or charge, fed into the vessel preferably occupies a quarter of its capacity, below which a normal burner, of the type used in common boilers, opens into the vessel.

The system is initiated by flame triggering with said burner.

The time required for triggering by the flame is of the order of one minute.

When triggering has occurred, the entire vessel or reactor is subjected to forced suction by a fan by which it is emptied of its initial reaction gas, the suction fan after a short period then reducing the pressure within the vessel or reactor to prevent undesirable combustion reactions.

The absolute pressure within the reactor is stabilized at around 250 mm Hg.

The lack of air within the reactor considerably slows down the combustion process, which was initially accompanied by flame, to then become increasingly more similar to thermal cracking.

After this initiation step, with the reaction stabilized, normal operation commences, during which an oxidizing agent, generally oxygen, is fed into the reaction chamber in a quantity from 0.5 to 1.5 wt % of the material to be treated.

Care must be taken to feed the oxidizing agent, facilitating the process of molecular breakdown, at a rate which does not result in the creation of centres of combustion with triggering of flame.

During the entire reaction, the feed of oxidizing agent is constantly balanced with the quantity of reaction gas generated by the molecular splitting of the polymer chains, in order to favour the entire process to the maximum extent.

The molecular splitting of the polymer chains is aimed at restoring certain chemical parameters which preceded the formation of polymer chains, in the absence of combustion and with the intention of obtaining the greatest possible gas quantity as the final result of the reaction.

The reaction gases obtained in this manner are fed to a condenser which converts them into liquid form (phase).

The process comprises purifying the obtained liquid phase of undesirable substances and by-products, principally the sulphur component if present in the starting materials. Another undesirable component is the chlorine component which, if present on entry, is eliminated by circulation through a suitable removal circuit followed by neutralization by treatment with calcium carbonate $CaCO_3$ or sodium bicarbonate $2NaHCO_3$.

The liquid cleaned of the undesirable components is fed to certain vessels performing the double task of storage and further purification of the product by gravity.

The entire system requires a suitable vent to prevent pressurization during the cycle. In this manner there is extracted from most of the polymerized CH chains a quantity of gas and/or liquid of high calorific value and at low depolymerization cost.

All those parts which cannot be transformed are discharged at the end of the cycle and are classed as process residues.

Said residues are not necessarily unsuitable for other possible uses, but are unsuitable for adequate transformation with the present process.

The nature of the residues in question means that they may be able to be reused by other techniques of destructive type such as combustion, or of selective type based on individual polymer chains, with consequent processing to obtain products suitable for moulding or extrusion.

If required by local regulations, the process can include cleaning of the off-gases and emissions by known means.

DETAILED DESCRIPTION OF THE INVENTION

Figure 1:
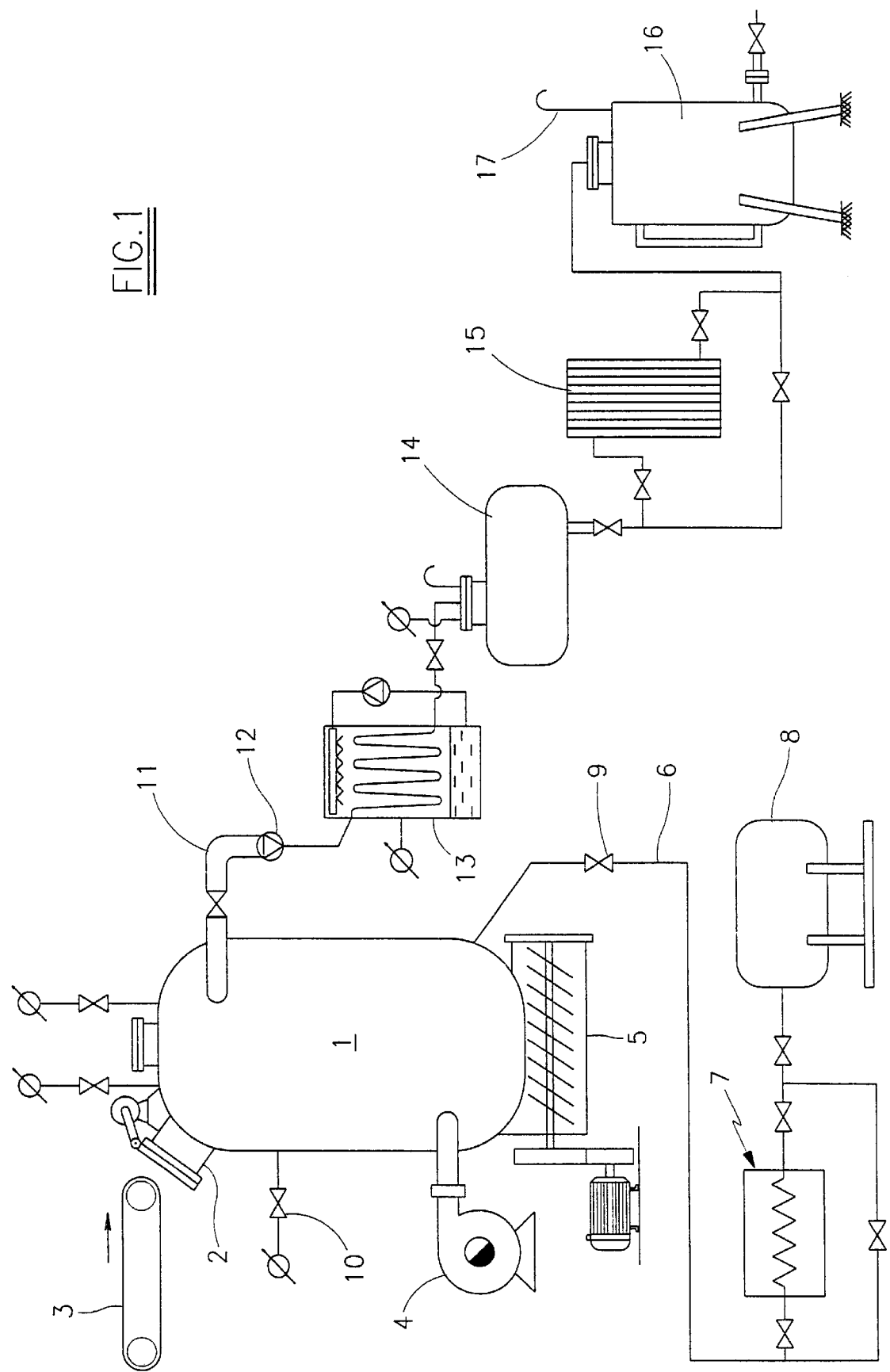
FIG. 1 is a schematic diagram of a plant for use in the present invention.

The aforedescribed process is implemented in a plant illustrated schematically in FIG. 1, the description of which will include further process parameters.

Said plant comprises a vessel or reactor 1 provided with a sealed closure hatch 2 through which the material to be treated is loaded with the aid of a conveyor 3. The material occupies about a quarter of the volume of the reactor 1, to the base of which there is applied a normal fuel oil burner 4 for the purpose of triggering the reaction.

Into a reactor of inner diameter 1500 mm and internal height of 4500 mm, material is loaded to a volume equal to about a quarter of the reactor volume.

At the base of the reactor 1 there is shown a usual system 5 for discharging the spent product.

One or more conduits 6 open into the base of the reactor 1 below the material to be treated, they originating from an evaporator 7 fed by the vessel 8 containing oxygen or ozone, to be fed into the material.

The conduit 6 comprises known means 9 for metering the oxygen or ozone.

Valves 10 for the feed of air in addition to or as an alternative to the oxygen feed can be provided in the upper part of the reactor.

The oxygen fed during the cycle is from 0.5 to 1.5 wt % of the material to be treated, and is preferably of the order of 1 wt %.

From close to the top of the reactor there extends a gas collection conduit 11 which, by means of a fan 12 positioned upstream of the condenser, leads the gases to a condenser 13 in which they are reduced to the liquid phase.

Besides emptying the reactor of the off-gases generated during the triggering stage of the process, the action of the fan reduces the absolute pressure within the reactor to close to 250 mm Hg during normal operation.

The temperature at which depolymerization occurs, with simultaneous infeed of oxygen, is of the order of 200° C.

The condenser 13 is of the water-cooled type and reduces the temperature to between about 45° C. and 50° C.

Downstream of the condenser 13 there are provided in series a separator 14 for separating the sulphur, and a dechlorination device 15, downstream of which the liquid is stored in a tank 16 provided with means 17 to prevent its pressurization.

The separator 14 is a vessel with a grid which retains the sulphur present in the condensate in the form of paste or pulp.

The dechlorination device is a usual device operating with calcium carbonate $CaCO_3$ or sodium bicarbonate $2NaHCO_3$, within which the chlorine is collected in the form of chloride salts.

The liquid collected in the tank has the appearance of a liquid of greater or lesser viscosity depending on the material treated, and has a calorific value of between 3,000 and 10,000 kCal/kg.

The ratio of the liquid obtained to the material treated is of the order of about 0.8 liters per kilogram.

The treatment of a load of material based on CH chains requires about one hour, and leaves a solid residue equal to about 10% of the material fed into the reactor.

The process is interrupted when a substantial reduction in the liquid produced is noted, due partly to depletion of the material but mainly to the fact that the quantity of material composed of process residues remaining in the reactor is too small.

The residual material is withdrawn from the reactor and set aside until, after about ten cycles, a quantity of residual material sufficient to form a new load has accumulated. It is not worth while to repeat the treatment of the residual material more than once.

The process has been described as a batch process, but it can also be implemented as a continuous process in a reactor provided with convenient sealed means for loading the material.

What is claimed is:

1. A process for treating materials containing CH polymer chains comprising the following steps:

by external means, triggering combustion of the material in an environment insulated from outside the environment;

drawing off the gaseous combustion products from said environment to put it at an absolute pressure of about 250 mm Hg;

feeding combustion-supporting gas while maintaining the environment at an absolute pressure of about 250 mm Hg and at a temperature of about 200° C.;

condensing the produced gases and collecting the condensate in a non-pressurized environment.

2. The process as claimed in claim 1, wherein the combustion-supporting gas is oxygen or ozone and is fed in a quantity from 0.5 to 1.5 wt. % of the material under treatment.

3. A process as claimed 1, wherein the condensate is subjected to sulphur separation treatment.

4. The process as claimed in claim 1, wherein the condensate or the product gases are treated with calcium carbonate or sodium bicarbonate to nuetralize chlorine.

5. A plant for treating materials containing polymer CH chains, comprising a reactor sealingly insulated for containing the material to be treated; means for loading the reactor, means for discharging and removing the process residues; means for triggering combustion inside the reactor; means for putting the reactor under vacuum by suction; means for feeding and metering oxygen or ozone into the reactor; means for condensing the gases withdrawn from the reactor; and means for collecting the condensate, wherein the means for putting the reactor under vacuum comprise a fan arranged to create an absolute pressure of about 250 mm Hg in the reactor.

* * * * *